Dec. 27, 1966 YOSHIKAZU KUZE 3,293,848
HYDROSTATIC POWER TRANSMISSION

Filed Sept. 9, 1965 6 Sheets-Sheet 1

INVENTOR
Yoshikazu Kuze

Stevens, Davis, Miller & Mosher
ATTORNEYS

INVENTOR
Yoshikazu Kuze

BY Stevens, Davis, Miller & Mosher
ATTORNEYS

Fig. 3

Dec. 27, 1966  YOSHIKAZU KUZE  3,293,848
HYDROSTATIC POWER TRANSMISSION
Filed Sept. 9, 1965  6 Sheets-Sheet 6

INVENTOR
Yoshikazu Kuze
BY Stevens, Davis, Miller & Mosher
ATTORNEYS

United States Patent Office 3,293,848
Patented Dec. 27, 1966

3,293,848
HYDROSTATIC POWER TRANSMISSION
Yoshikazu Kuze, 64 Chidori-cho, Chofu, Ota-ku,
Tokyo, Japan
Filed Sept. 9, 1965, Ser. No. 486,081
Claims priority, application Japan, Sept. 24, 1964,
39/54,638
8 Claims. (Cl. 60—53)

This invention relates to hydrostatic power transmission and more particularly to a fluid operated transmission for use in an automotive vehicle.

It is a general object of the invention to provide a compact, efficient transmission of the above type.

Another object of the invention is to provide a hydrostatic power transmission without the use of any mechanical clutch, transmission gears, differential gear mechanism and brake means.

A further object of the invention is to provide a hydrostatic power transmission wherein differential lock is available.

A further object of this invention is to provide a hydrostatic power transmission wherein a pair of oil motor units are available as a cartridge.

Other and further objects and advantages of the invention will be readily apparent from the following description and drawings in which.

Figure 1:
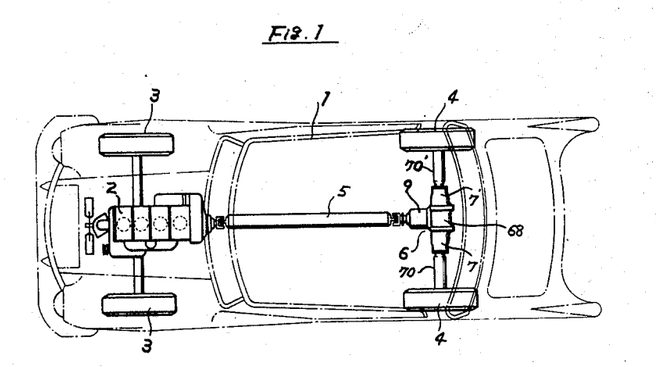
FIG. 1 is a schematic plan view of an automobile illustrating the invention in its simplest form.
Figure 2:
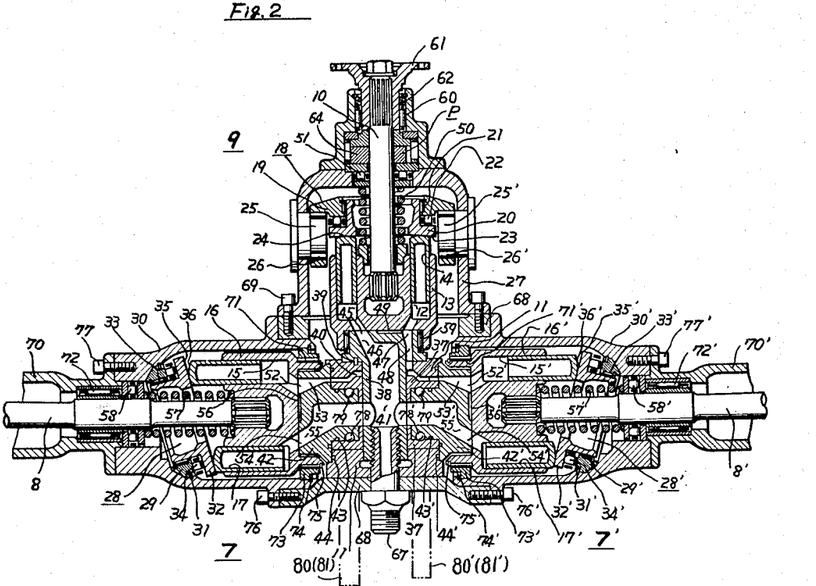
FIG. 2 is a transverse sectional plan view of the hydrostatic power transmission which is generally shown in FIG. 1.

Reference should now be made to FIG. 1 of the drawings, in which numeral 1 designates an automobile, 2 an engine, 3 and 4 the front wheels and the rear wheels, respectively, and 5 a drive shaft.

The hydrostatic power transmission 6 embodies a pair of oil motor units 7 and 7', splined to and rotatable with rear axle shafts 8 and 8' which are aligned on a straight line and arranged symmetrically, a variable displacement oil pump unit 9, splined to and rotatable with a power input shaft 10 disposed transversely to said oil motor units 7 and 7' and the oil pump unit 9 and the oil motor units 7 and 7' are in fluid communication with each other through an oil passage connecting stationary means. The pump has a plurality of annularly spaced cylinder bores 12 in the cylinder block 13 in which hollow plungers 14 are reciprocably mounted. The motors 7 and 7' are comprised of cylinder blocks 16 and 16', cylinder bores 15 and 15' and hollow plungers 17 and 17' similar in form to the pump 9.

The hollow plungers 14 of oil pump 9 are arranged to be operated by a rotatable swash plate 18 comprising an annular outer member 19 and an annular inner member 20 being rotatably mounted on the outer member 19 by means of a radial needle bearing 21 and a thrust bearing 22. The face 23 of the inner member 20 is engageable against an adjacent curved end surface 24 of the hollow plungers 14. The annular outer member 19 is pivotally mounted on the projecting hinge pins 25 and 25' through the needle bearings 26 and 26' to a stationary cup-shaped pump housing 27, and operable to swing in an arcuate path intersecting the axis of the power input shaft 10.

Numerals 28 and 28' are fixed-angle swash plates of oil motors 7 and 7' which have outer annular supporting members 29 and 29' secured to cup-shaped motor housings 30 and 30' by means of snap rings 31 and 31' and inner annular members 32 and 32' being rotatably mounted on the outer annular supporting members 29 and 29' through needle bearings 33 and 33' and the roller thrust bearings 34 and 34'. The faces 35 and 35' of the inner annular members 32 and 32' are engageable against the adjacent curved end surfaces 36 and 36' of the hollow plungers 17 and 17'.

Figures 5, 6, 7, 8, 9, 10, 11, 12:
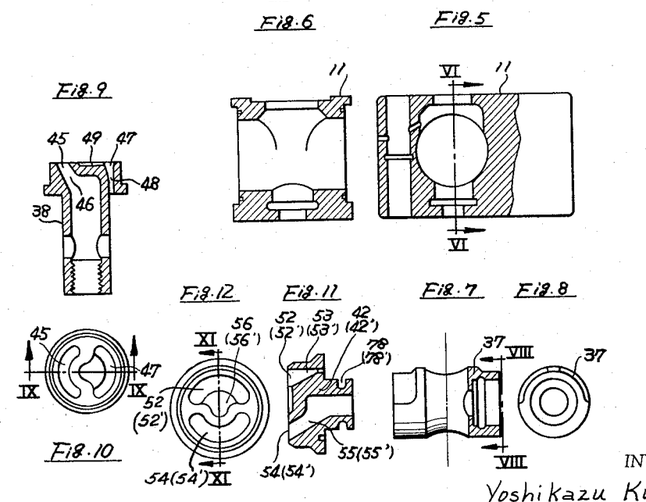
FIG. 5 is a longitudinal partial sectional view of a stationary manifold.
FIG. 6 is a sectional side view taken along line VI—VI of FIG. 5.
FIG. 7 is a supporting manifold shown partially in section.
FIG. 8 is an end view taken along VIII—VIII of FIG. 7.
FIG. 9 is a sectional plan view of a stationary valve block manifold taken along line IX—IX of FIG. 10.
FIG. 10 is a side view.
FIG. 11 is a sectional plan view taken along line XI—XI of FIG. 12 of a rotatable valve block.
FIG. 12 is a side view of a rotatable valve block.
Figure 13:
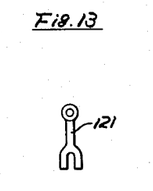
FIG. 13 is a view of the shifting fork.
Figure 14:
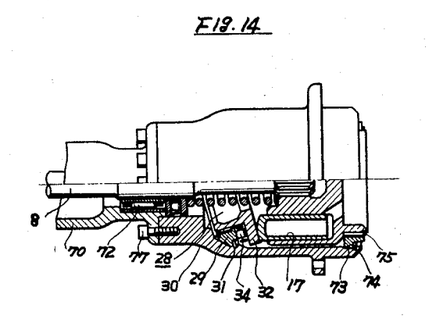
FIG. 14 is a view, partly in section, of a motor unit available as cartridge.

An oil passage connecting stationary means comprises a stationary manifold 11 (FIG. 5, FIG. 6) and a motor valve block supporting manifold 37 (FIG. 7, FIG. 8) and a stationary valve block manifold 38 (FIG. 9, FIG. 10). In the inside of the stationary manifold 11 is provided a motor valve block supporting manifold 37 inserted together in fluid-tight relationship and being co-linear with the axis of said rear axle shafts 8 and 8'. The stationary valve block manifold 38 of the oil pump 9 is in fluid-tight relationship perpendicularly crossing through the stationary manifold 11 and supporting manifold 37, being co-linear with the axis of said input shaft 10. The stationary valve block manifold 38 is fixed against rotation relative to the said stationary manifold 11 by knock pin 39. The high pressure oil passage 40 in the outside connects the discharge side of the pump 9 to the intake side of oil motors 7 and 7' while the low pressure oil passage 41 in the inside, connects the discharge side of the oil motors 7 and 7' to the intake side of the oil pump 9.

The rotatable valve blocks 42 and 42' are fitted in fluid tight relationship through O-rings 43, 44, 43' and 44' but rotatably mounted at opposite ends of the motor valve block supporting manifold 37.

The face of the stationary valve block manifold 38 is provided with an intake port opening 45 connected with an arcuate collector channel 46 and a discharge port opening 47 connected with arcuate collector channel 48, whose center of curvature coincides with the axis of the power input shaft, and a cavity 49 having a properly arranged pressure applied area which is connected to the high pressure oil passage 40. The pressing force applied between the face of the cylinder block 13 and the face of the stationary valve block manifold 38 may be set at any desired value. There are also provided a spring 50 and a thrust bearing 51 with which to prevent separation of the face of the cylinder block 13 from the face of the stationary valve block manifold 38 under no-load conditions.

The face of the rotatable valve blocks 42 and 42' are provided with intake port openings 52 and 52' connected with arcuate collector channels 53 and 53', and discharge port openings 54 and 54' connected with arcuate collector channels 55 and 55', whose center of curvature coincides with the axis of rear axle shafts 8 and 8', and cavities 56 and 56' having a properly arranged pressure applied area which is connected to the high pressure oil passage 40. The pressing force applied between the face of the cylinder blocks 16 and 16' and the face of the rotatable valve blocks 42 and 42' may be set at a desired value. There are also provided springs 57 and 57' and thrust bearings 58 and 58' with which to prevent separation of the face of the cylinder blocks 16 and 16' from the face of the rotatable valve blocks 42 and 42' under no-load conditions.

The cylinder block 13 is splined to the power input shaft 10 and is rotatably mounted within the pump housing 27 supported in two set of needle bearings 59 and 60. Numeral 61 is yoke, which is splined to the input shaft 10 and 62 is the oil seal between the yoke and the housing 27.

Figure 3:
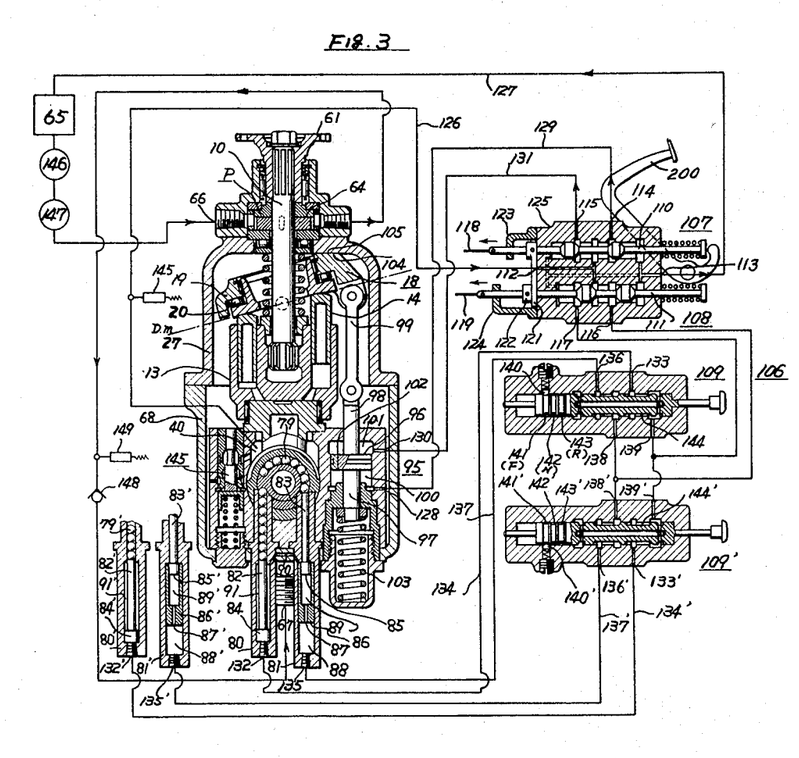
FIG. 3 is its longitudinal sectional side view of FIG. 2.

The pump P (FIG. 3), with the rotor 64 fastened to the input shaft 10, has the function of drawing oil from the reservoir 65 under a slight pressure and feeding it in the direction, shown by the arrows in FIG. 3, to the port 66, through the intake port opening 45, to supply the port 67.

The cup-shaped pump housing 27 is bolted to the supporting member 68 by a plurality of stud screws 69 arranged in annularly spaced relation.

The cylinder blocks 16 and 16' are splined to rear axle shafts 8 and 8' which rotate through rear axle housings 70 and 70' and are rotatably mounted within the motor housings 30 and 30' supported in two sets of needle bearings 71, 71' and 72, 72'.

Annular spacer rings 73 and 73' are secured to the cup-shaped motor housings 30 and 30' by means of snap rings 74 and 74' in the grooves in the housings 30 and 30' in which position they hold the cylinder blocks 16 and 16' against longitudinal movement. Numerals 75 and 75' are the snap rings which hold the needle bearings 71, 71' in position.

The cup-shaped motor housings 30 and 30' are bolted to the supporting member 68 by a plurality of stud screws 76 and 76' which arranged in annularly spaced relation. The rear axle housings 70 and 70' are bolted to the housings 30 and 30' by a plurality of stud screws 77 and 77' arranged in annularly spaced relation.

The rotatable valve blocks 42 and 42' are provided with grooves 78 and 78' which are formed around the outer periphery over a semi-circle (FIG. 11) and a number of steel balls 79 and 79' are slidably engaged in each of the grooves 78 and 78'.

A pair of cylinders 80, 81 and 80', 81' are secured extending through the stationary manifold 11 and the supporting member 68 (FIG. 3). The heads of the pistons 82, 83 and 82', 83' are engaged with the steel balls 79 and 79', respectively. The pistons 84 and 84' are larger in diameter than the opposing pistons 85 and 85' and the pistons 86 and 86' are larger in diameter than the pistons 84 and 84'. The orifices 87 and 87' are provided in the pistons 86 and 86' and connect the chambers 88 and 88' to the chambers 89 and 89'. The passages 90 and 90' interconnect the bases of a pair of cylinders 80, 81 and 80', 81'.

For the purpose of tilting the revolving swash plate 18 there is provided a differential piston device 95 housed within the stationary manifold 11 (FIG. 3). As illustrated herein, this device consists of a piston 96 having piston rods 97 and 98 extending from both sides thereof. The diameter of piston rod 97 is larger than the diameter of piston rod 98 and reciprocatory piston 96 cooperates with the piston rods 97 and 98, the latter being connected to the movable swash plate 18 by the arm 99. The cylinder chambers 100 and 101 lie on either side of the piston 96 and are in communication through an orifice 102. The spring 103 is adapted to urge the revolving swash plate 18 to a maximum inclination limited by engagement of a stopper 104 with inner part 105 of the housing 27.

Outside of the hydrostatic power transmission there is a controlling valve group 106. This controlling valve group 106 consists of a controlling valve 107 which is operatively connected to the brake pedal 200 and is operatively connected to rotate the movable swash plate 18 vertically with respect to the input shaft 10 thereby to cutoff the discharge of oil pump; a controlling valve 108 with which to reverse the rotation of the oil motors 7 and 7'; and the controlling valves 109 and 109' which independently control the left or right rear wheel respectively.

The controlling valves 107 and 108 are provided with the valve spools 110 and 111, respectively, and are provided with the openings 112 to 117.

Figure 4:
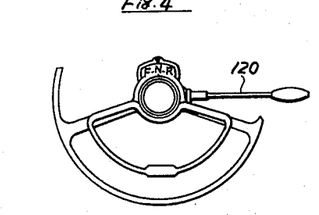
FIG. 4 is an automobile steering wheel and shifting lever.

A valve spool 110 is engaged to brake pedal (not shown) by means of link, rod etc., and the rods 118 and 119 are connected to the spools 110 and 111 and are operatively connected to shifting lever 120 (FIG. 4). Numeral 121 is a shifting fork which is secured to the valve spool 110 and is engaged to the collar 122 fixed to valve spool 111. Numerals 123 and 124 are limiting stops secured to the housing 125.

An opening 112 is connected with the high pressure oil passage 40 through the conduit 126 while an opening 113 is connected with the reservoir 65 through the conduit 127. The opening 114 is connected with an opening 128 which is in communication with the cylinder chamber 100 through a conduit 129. The opening 115 is connected to an opening 130 which is in communication with the cylinder chamber 101 through a conduit 131.

An opening 132 is connected to an opening 133 by a conduit 134 and an opening 135 is connected to an opening 136 by a conduit 137. And an opening 132' is connected to an opening 133' by a conduit 134' and an opening 135' is connected to an opening 136' by a conduit 137'. The openings 138 and 138' are connected to opening 116 and openings 138' and 139' are connected to the opening 117. Spring loaded balls 140 and 140' engage with grooves 141, 142, 143 and 141', 142', 143' respectively formed on the valve spools 144 and 144' respectively to hold the spool in forward, neutral, or reverse position after it has been shifted by one of the manual means. This allows the valve spools 144 and 144' to be controlled by an electrical impulse, such as from a manual pushbutton or cam-operated limit switch.

Each controlling valve group 106 is shown outside of the hydrostatic power transmission in FIG. 3 with a view to make more comprehensive the given explanation, but actually the valves are arranged within the stationary manifold 11, each being connected with the shortest possible oil passage so as to keep the pressure drop at a minimum.

FIG. 3 illustrates an example wherein the relief valve 145 is arranged in the stationary manifold 11.

Numeral 146 is a filter, 147 a cooler, 148 a check valve, and 149 a low pressure relief valve, 145 a high pressure relief valve.

In the device constructed as above described, if the oil pump 9 is rotated by means of the engine 2, it causes the reciprocation of the group of pump plungers 14 through the inclination of movable swash plate 18. The pressurized oil then produced is supplied into the group of motor plungers 17 and 17' through the high pressure oil passage 40, the intake port openings 52 and 52' thereby the motor plungers 17 and 17' will push outwardly against the fixed angle swash plates 28 and 28' serving to rotate the cylinder blocks 16 and 16'. The oil which has done its work is fed back to the intake side 41 in the oil pump 9 through the discharge ports 54 and 54' of the rotatable valve blocks 42 and 42'. The cylinder blocks 16 and 16' will be caused to rotate as long as fluid under pressure is supplied to the intake port openings 52 and 52' and the pump swash plate 18 is maintained in an inclined position.

The revolving swash plate 18 is normally biased by the spring 103 to a position Dm in which the swash plate 18 is so inclined that the oil motors are rotated in a forward direction.

If the load on the automobile 1 becomes increased, the oil pressure in the discharge side of the oil pump 9 is increased. And when the oil pressure yield in the discharge side of the oil pump goes beyond the predetermined value, the piston 96 moves downward against the spring 103 thereby reducing the inclination of the swash plate 18.

The inclination of the swash plate 18 is in an inverse proportion to the oil pressure produced on the discharge side of the oil pump. It is possible to automatically change the rotating speed of the oil motors 7 and 7' in an inverse proportion to the load. It should thus be noted that the range of speed and torque at the oil motors 7 and 7' is automatically in an inverse proportion.

Figure 17:
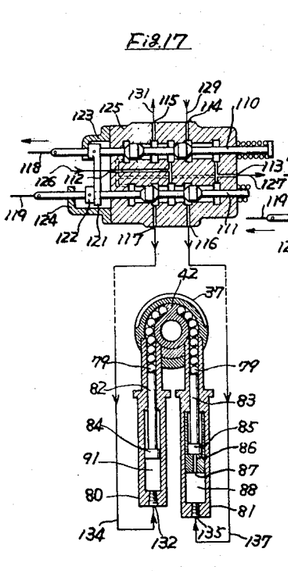
FIG. 17 is a sectional view of the controlling valve in a neutral position.
Figure 18:
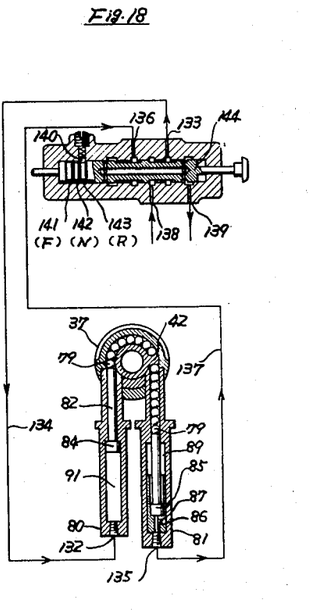
FIG. 18 is a sectional view of independent control valve in a reverse position.

If the brake pedal is pressed down, the spool valve 110 is shifted toward left-hand, shown by an arrow in FIG. 3, to cut off the communication between the openings 112 and 114, thereby fluid under pressure in the cylinder chamber 100 is placed into communication with the drain line 127 (FIG. 17). As a result the swash plate 18 is placed at a right angle to the axis of the input shaft 10, and the pump plungers 14 do not reciprocate and the input shaft will stand idle. Then no rotative force will be transmitted to the oil motors 7 and 7'.

In this case, the pressurized oil fills the passage between the oil pump and the oil motors. Therefore when the oil motors are urged to revolve by the rear wheels, they serve as a pump to discharge oil. As the plunger at the pump side makes no reciprocation, the back flow from the oil motors comes to a standstill at the plungers in the oil pump. That is, the rear wheels are braked.

The strength of braking can be varied in accordance with the rate of pressing down the brake pedal.

In the case of stopping the car while the engine is running, the shifting lever 120 is moved over to the neutral position N (FIG. 4), therein the shifting rod 118 is moved in a direction, shown by an arrow in FIG. 3, just the same as in the case of pressing down the brake pedal (FIG. 17).

Thus, according to the invention, it is not necessary to provide any clutch mechanism.

Figures 15, 16:
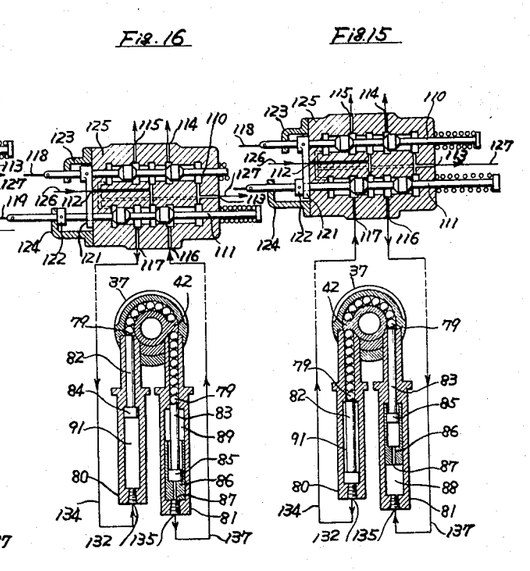
FIG. 15 is a sectional view of the controlling valve in a forward position.
FIG. 16 is a sectional view of the controlling valve in a reverse position.

If the shifting lever 120 is changed over to the reverse position R (FIG. 4), the shifting rod 119 is shifted toward left hand direction, shown by an arrow in FIG. 3 causing the spool valve 111 to be moved to a position in FIG. 16, directing fluid under pressure into the oil cylinder chambers 91 and 91' through the passages 134 and 134'. And the passages 137 and 137' will be placed into communication with the drain line 127. The oil pressure, therefore, is supplied to the oil cylinders 80 and 80' only to press the piston rods 82 and 82' upwards to push the group of balls 79, thereby rotating the valve blocks 42 and 42' in the supporting manifold 37 over 180°, thereby causing rotation of the oil motors 7 and 7' in the reverse direction.

Figure 19:
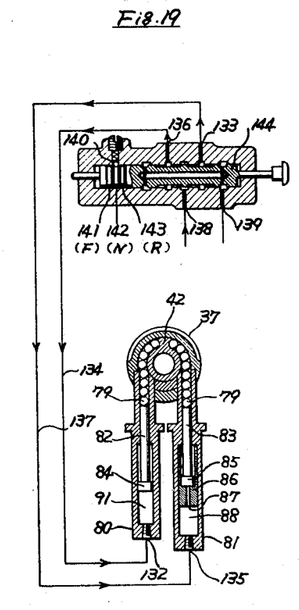
FIG. 19 is a sectional view of independent control valve in neutral position.

In case one of the driving wheels 4 becomes mired in a muddy spot, or becomes retarded by some obstruction in the road or the like, assuming that the oil motor on the mired side is 7, the valve spool 144 of the controlling valve 109 is moved to the mid position N, then as illustrated in FIG. 19 the pressurized oil is supplied to the cylinders 80 and 81 simultaneously, consequently bringing the larger diameter piston 86 into engagement with the inside wall of cylinder 81 and the piston 84 moves upward against the piston 85 which comes to stop inside of the wall of the piston 86. Thus the motor valve blocks 42 are rotated 90° in the supporting manifold 37, to cause the cylinder block 16 to be locked at the neutral position N. Meanwhile, there is simultaneous forcing of all the liquid into the other motor, 7', thus throwing the full power of the engine into the motor 7' for the purpose of starting the vehicle.

Figure 20A:
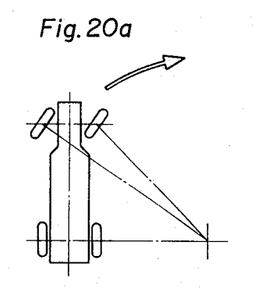
FIG. 20a is a view of ordinary radius of gyration of a car.
Figure 20B:
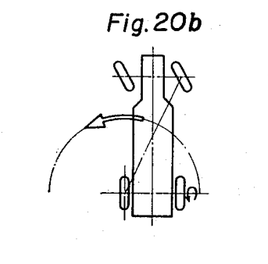
FIG. 20b is a view of the left-hand rear wheel locked.
Figure 20C:
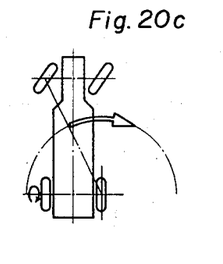
FIG. 20c is a view of the right-hand rear wheel locked.
Figure 20D:
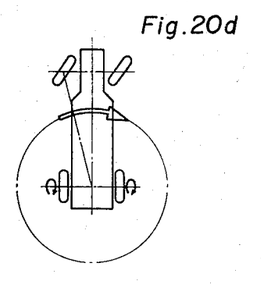
FIG. 20d is a view of the spin rotation.

It is also possible to obtain a minimum radius of gyration of a car either as shown in FIGS. 20a, 20b, 20c by locking one of the driving wheels. It is further possible to perform spin-rotation by rotating the left and right wheels reversely to each other as shown in FIG. 20d.

The above-mentioned operations are achieved by positioning the valve spools 109 and 109' to forward F, neutral N, reverse R.

In the present invention the supporting manifold 37 is fluid-tightly inserted in the inside of the stationary manifold 11 co-linear with the axis of the rear axle shafts 8 and 8' and the rotatable valve blocks 42 and 42' are provided individually rotatably mounted at opposite ends of the supporting manifold 37. Further there is provided a stationary valve block manifold 38, in fluid-tight relationship perpendicularly crossing through the stationary manifold 11 and the supporting manifold 37 co-linear with the axis of the input shaft 10. The high pressure oil passage 40 is formed in the outside and the low pressure oil passage 41 in the inside. Through the high pressure oil passage 40, the discharge side of the oil pump 9 is connected to the intake side of a pair of oil motors 7 and 7', while the discharge sides of the oil motors 7 and 7' are connected to the intake side of the oil pump 9 through the low pressure oil passage 41, whereby the closed-circuit from the pump 9 to a pair of oil motors 7 and 7' is achieved with the shortest passage, thereby enabling the discharged oil from an oil pump 9 to supply the oil motors in good balance.

By arranging the ratio of the maximum capacity of the oil pump 10 to the capacity of a pair of oil motors, it is possible to obtain a so-called fluid reduction mechanism having the differential effects.

The differential effect of this invention is due to the fact that the pressure, being equal in all directions on the oil, exerts an equal pressure on the plungers and other driven parts in the oil motors 7 and 7' and thus causes these driven parts in motors 7 and 7' to revolve in accordance with the resistance to be overcome, all parts in members 7 and 7' having equal dimensions. For instance, if there is more resistance at the rear shaft 8 than at the rear shaft 8', the driven parts in the motor 7 revolve correspondingly faster.

When the brake pedal is pressed down, movements to the left of the spool valve 110 is accompanied by movement of the spool valve 111 to neutral position by shifting fork 121 (FIG. 17), thereby avoiding dangerous overpressure and a shock in low pressure passage 41.

From a machining point of view it is impossible to arrange the inner faces of cylinder blocks 16 and 16' of oil motors to absolutely coincide with the cooperating contacting faces of revolving valve blocks 42 and 42'.

Most particularly it is important to maintain the seal between the cylinder blocks 16 and 16' and the rotatable valve blocks 42 and 42'.

The seal faces may be most easily provided by machining the motor units as a cartridge.

What I claim is:
1. A hydrostatic transmission comprising a substantially T-shaped housing having a crossbar portion, a pair of reversible oil motors having aligned output shafts mounted symmetrically in opposing relationship within the crossbar portion of said housing, a variable displacement oil pump having an input shaft, input and discharge sides and being mounted in a depending portion of said housing intermediate to and perpendicular to said oil motors, said oil motors being in fluid communication with said pump through an oil passage connecting means, said means comprising: a stationary manifold, a motor valve block supporting manifold inserted into said stationary manifold, colinear with the axis of said oil motors, a rotatable valve block rotatably mounted inside and at opposing ends of said supporting manifold, a pump stationary valve block manifold defining therein a passage perpendicularly crossing the stationary manifold and said supporting manifold colinear with the axis of said input shaft, a central passage in a stationary valve block manifold and in communication with a central passage in a supporting manifold, said passage communicating a discharge side of the oil motors with said intake side of the oil pump, and a space being formed between a portion of the outer periphery of said motor valve block supporting manifold and the inner periphery of said stationary manifold, said space communicating a discharge side of the oil pump with an intake side of the oil motors.

2. A hydrostatic transmission comprising a substantially T-shaped housing having a crossbar portion, a pair of reversible oil motors having aligned output shafts mounted symmetrically in opposing relationship within the crossbar portion of said housing, a variable delivery oil pump having an input shaft, input and discharge sides and being mounted in a depending portion of said housing, said pump having rotatably mounted therein a swash plate pivoted with variable inclinations by means of diametrically arranged pins and being loosely fitted around the outer periphery of a plunger control ring, a free end of said pump swash plate being operatively connected to differential pistons, chambers formed on either side of said pistons and being in communication with the discharge side of said pump, said pistons being biased towards the larger pressure receiving area, said T-shaped oil passage being defined within a stationary manifold, a motor valve block supporting manifold inserted into said stationary manifold colinear with the axis of said oil motors, a rotatable valve block rotatably mounted inside and at opposing ends of said supporting manifold, a pump stationary valve block defining therein a passage perpendicularly crossing the stationary manifold and said supporting manifold colinear with the axis of said input shaft, a central passage in a stationary valve block manifold in communication with a central passage in a supporting manifold, said passage communicating a discharge side of the oil motors with an intake side of the oil pump and a space being formed between a portion of the outer periphery of said motor valve block supporting manifold and the inner periphery of said inner stationary manifold, said space communicating a discharge side of the oil pump with an intake side of the oil motors.

3. A hydrostatic power transmission comprising a substantially T-shaped housing having a crossbar portion, a pair of reversible oil motors having aligned output shafts mounted symmetrically in opposing relationship within the crossbar portion of said housing, a variable delivery oil pump having an input shaft and being mounted in a depending portion of said housing, said oil pump being operatively connected to be driven by an engine of a vehicle, said oil pump being further operatively connected through fluid coupling means to drive said oil motors, said pump comprising a rotatable input shaft drivingly connected to said engine, each said motor comprising a rear axle shaft drivingly connected to separate driven means, the rear axles of said motors being colinear and extending perpendicularly from either side of the rotative axis of said input shaft, said pump and said motors each comprising a rotatable cylinder block fixedly mounted on a respective one of said shafts and including a plurality of axially extending plungers concentrically and parallelly arranged about the corresponding rotative axis of said shaft, a motor valve block supporting manifold being substantially colinear with the axis of said motor shafts, a pump stationary valve block manifold perpendicularly crossing the motor valve block supporting manifold, said pump stationary valve block manifold being substantially colinear with the axis of said input shaft, a rotatable valve block rotatably mounted at opposite ends of said motor valve block supporting manifold, an opening lying inside of said pump stationary valve block manifold connecting with an inside opening of said supporting manifold, said passage constituting a low pressure chamber, a space formed between a portion of the outer periphery of said motor valve block supporting manifold and the inner periphery of said stationary manifold constituting a high pressure chamber, said pump stationary valve block manifold being provided with an intake port opening connected with said low pressure chamber and a discharge port opening connected with said high pressure chamber, the motor rotatable valve block being provided with intake port openings connected with said high pressure chamber and a discharge port opening connected with said low pressure chamber, said port openings in said valve blocks constituting connected openings between certain of said plungers in each said cylinder block and said low pressure passage, a high pressure passage operatively connecting together other of said plungers in said pump and motor cylinder blocks.

4. A hydrostatic power transmission means according to claim 3 wherein said pump includes a pivotal swash plate for regulating the rotational speed at which said motor shafts are driven by said pump shaft, a speed control means connected to said swash plate for adjusting the pivotal position of said swash plate, said speed control means comprising a hydraulic cylinder and a piston having opposite pressure faces slidably mounted in said cylinder, said faces having different effective pressure areas, conduit means connecting to said high pressure passages to opposite ends of said cylinder.

5. A hydrostatic power transmission according to claim 3 wherein the rotatable valve blocks rotatably mounted at opposite ends of the supporting manifold comprise a flexible means having opposite ends engaged about the outer circumference of said rotatable valve blocks, further opposite ends of said flexible means being connected to pistons which are fitted to cylinders, said cylinders comprising oil passages, said pistons being arranged to have different diameters from each other of which the one with the largest diameter is engaged on its inner portion with another piston, said latter piston being arranged to have a still smaller diameter than an opposite piston wherein applying pressure alternately to said opposing pistons, said oil motors will be rotated forwardly and reversely while simultaneously application of pressure will lock said oil motors in a neutral position.

6. A hydrostatic power transmission according to claim 3 wherein the rotatable valve blocks rotatably mounted at opposite ends of said supporting manifold comprise a flexible means having ends engaged about the outer circumference of said rotatable valve blocks, opposite ends of said flexible means being connected to pistons which are fitted in cylinders, said cylinders comprising oil passages, said cylinders being arranged to have different diameters from each other of which the larger of said cylinders is engaged on its inner side with a piston, said piston being so arranged to have a still smaller diameter than an opposing piston, the inclination of the swash plate of said oil pump being made zero by the action of a brake pedal on said pistons.

7. A hydrostatic power transmission according to claim 3 wherein said oil motor units are in cartridge form.

8. A hydrostatic transmission comprising a T-shaped casing having a crossbar portion, an axial piston type pump mounted in a depending portion of said casing, two oil motors mounted in the crossbar portion of said casing in opposing axial alignment, said pump and said motors having inlet sides and discharge sides, the discharge side of said pump being connected to the inlet side of said motors and the discharge side of said motors being connected to the inlet side of said pump, a T-shaped connection pipe mounted within said casing having a T-shaped passage therein, each end of said passage being in axial alignment with at least one of said motors and said pump, a tubular oil supplied manifold rigidly mounted within each of said passages, a high pressure oil passage between the outer periphery of said oil supply manifold and the inner periphery of said connection pipe, a low pressure oil passage between said oil supply manifolds, a housing block and an oil distributor block for said pump and for each of said motors, said housing block being detachably mounted on said distributor blocks, said oil distributor blocks being mounted on the ends of said connection pipes, an input shaft being mounted on said pump cylinder and an output shaft being mounted on each of said oil motor cylinder blocks, differential cylinder means connected to said pump swash plate, said differential cylinder means comprising at least two chambers connected to the discharge side of the pump and the piston pump therebetween, an adjustable cylinder means having a piston therein connected to the rotatable valve block of said motors, a regulating valve connected to said differential cylinder means and said adjustable cylinder means for controlling the movement of said piston therein thereby controlling the direction of rotation of said motors.

References Cited by the Examiner
UNITED STATES PATENTS

| | | | |
|---|---|---|---|
| 1,136,363 | 4/1915 | Pepper | 60—53 |
| 3,200,593 | 8/1965 | Kuze | 60—53 |

EDGAR W. GEOGHEGAN, *Primary Examiner.*